United States Patent

Ducate, Sr.

[11] Patent Number: 4,603,773
[45] Date of Patent: Aug. 5, 1986

[54] APPARATUS FOR ASSEMBLING BLOWER WHEEL BLADES

[76] Inventor: John S. Ducate, Sr., 129 Brook Valley Rd., Columbia, S.C. 29204

[21] Appl. No.: 509,108

[22] Filed: Jun. 29, 1983

[51] Int. Cl.⁴ .............................................. B65G 37/00
[52] U.S. Cl. ........................... 198/468.2; 29/156.8 CF
[58] Field of Search ............... 198/486, 690, 456, 695, 198/653, 624, 434, 436, 441, 647, 489, 488, 482, 485, 487, 468.1, 468.2, 468.5; 29/156.8 CF, 709, 719, DIG. 73, DIG. 95; 269/296, 71

[56] References Cited

U.S. PATENT DOCUMENTS

| | | | |
|---|---|---|---|
| 2,537,805 | 1/1951 | Wilken | 29/156.8 |
| 2,651,830 | 9/1953 | Wilken et al. | 29/156.8 |
| 2,651,837 | 9/1953 | Wilken et al. | 29/156.8 CF |
| 2,821,778 | 2/1958 | Wilken | 29/23.5 |
| 2,864,087 | 12/1958 | Novinger et al. | 29/23.5 |
| 2,996,788 | 8/1961 | Austin et al. | 29/156.8 CF |
| 3,186,068 | 6/1965 | Austin et al. | 29/23.5 |
| 3,211,364 | 10/1965 | Wentling et al. | 29/156.8 CF |
| 3,253,318 | 5/1966 | Wentling et al. | 29/156.8 CF |
| 3,305,912 | 2/1967 | Wentling et al. | 29/156.8 CF |
| 3,641,644 | 2/1972 | Conniff et al. | 29/156.8 B |
| 3,737,966 | 6/1973 | Ranz | 29/156.8 CF |
| 3,844,682 | 10/1974 | Morris | 29/156.8 CF |
| 3,970,411 | 7/1976 | Wallman | 416/178 |
| 3,977,062 | 8/1976 | Wallman | 29/156.8 CF |
| 4,029,215 | 6/1977 | Birdwell | 198/489 |
| 4,041,593 | 8/1977 | Wallmann | 29/156.8 CF |
| 4,079,488 | 3/1978 | Yuda | 29/23.5 |
| 4,173,426 | 11/1979 | Schell | 198/690 |
| 4,356,905 | 11/1982 | Large | 198/690 |
| 4,361,413 | 11/1982 | Toda | 198/689 |

FOREIGN PATENT DOCUMENTS 526568  8/1976  U.S.S.R. ............................. 198/488

Primary Examiner—Joseph E. Valenza
Assistant Examiner—Kyle E. Shane
Attorney, Agent, or Firm—Pollock, Vande Sande & Priddy

[57] ABSTRACT

Automatic apparatus for assembling elongated, transversely curved blades in a fixture for holding the blades in a predetermined spaced relationship corresponding to the blade spacing in a centrifugal blower wheel. A first transfer assembly transfers individual blades from a die press to a conveyor and a second transfer assembly transfers individual blades from the conveyor to the fixture. Each blade is held in a fixed position on the first transfer assembly by suction and/or magnetic force, on the conveyor by magnetic force, on the second transfer assembly by magnetic and/or suction force, and in the fixture by a resilient clamping mechanism. A pushing device moves alternate blades axially relative to the remaining blades on the conveyor so that blades are loaded in the fixture with flanges at opposite ends of adjacent blades in a staggered relationship. The fixture includes a pair of coaxial pressure discs cooperating with resilient means on a pair of coaxial holding discs so as to clamp multiple blades in slots within the fixture. Provision is made for different numbers and sizes of blades and different fixture diameters.

8 Claims, 13 Drawing Figures

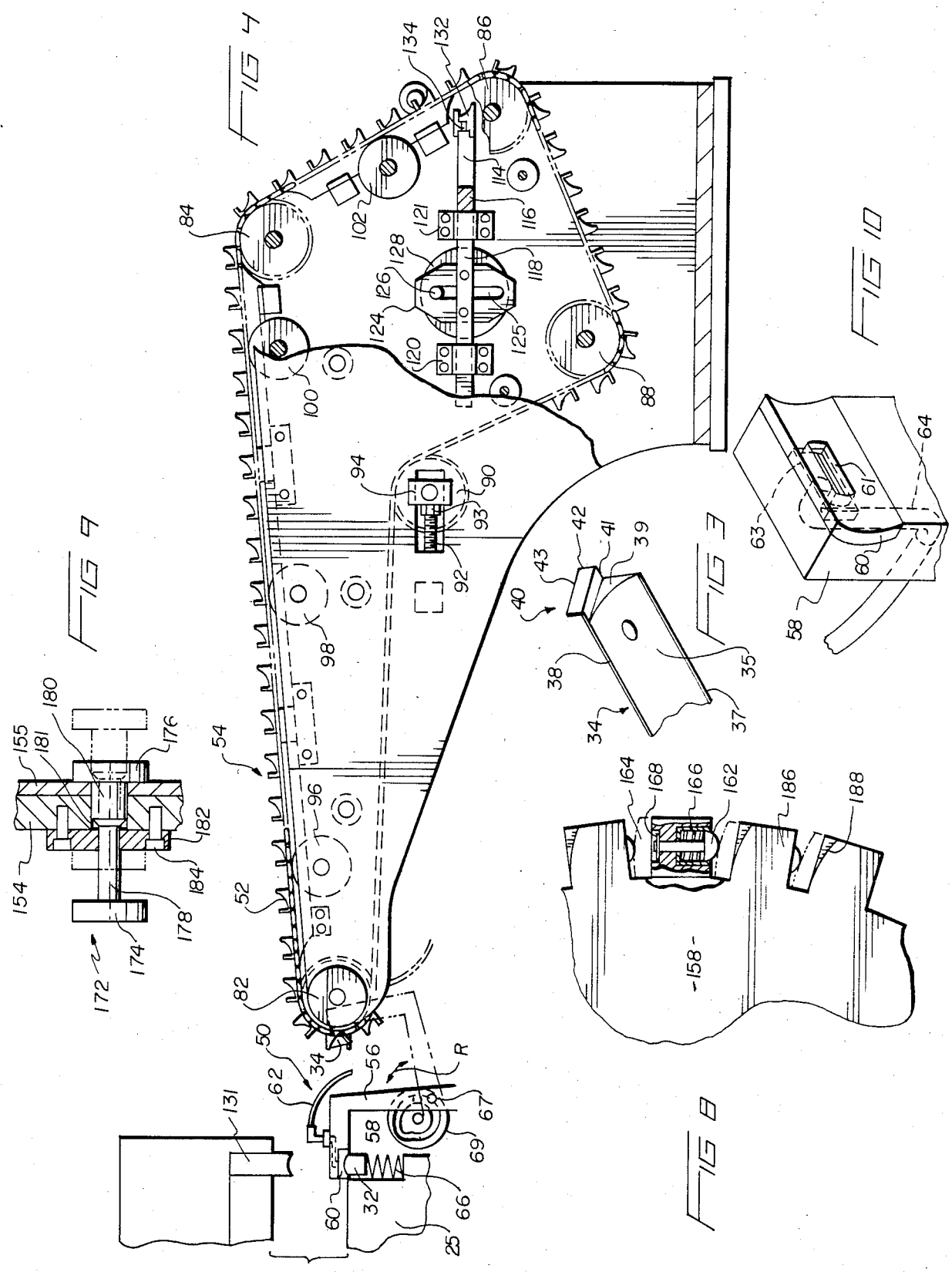

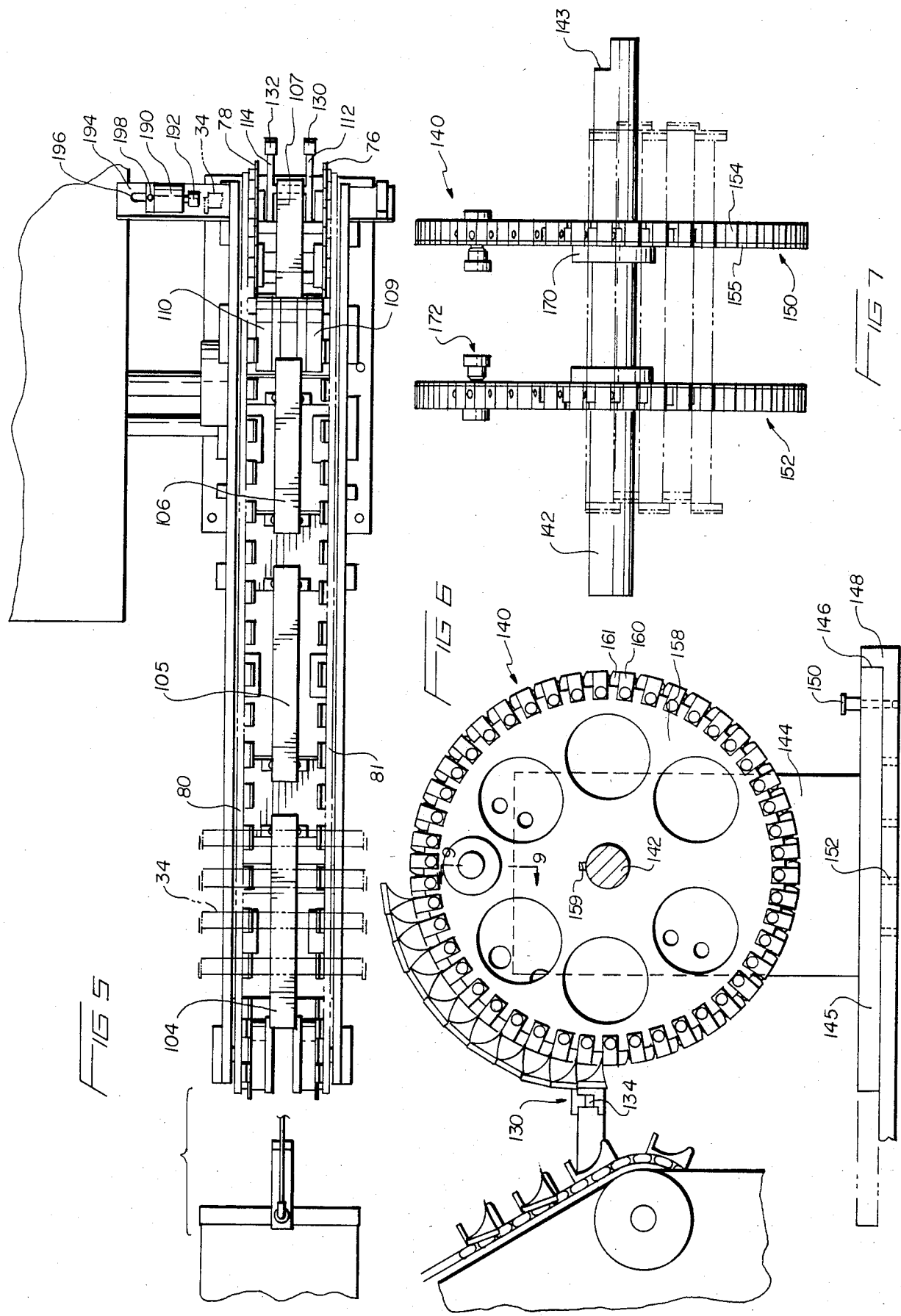

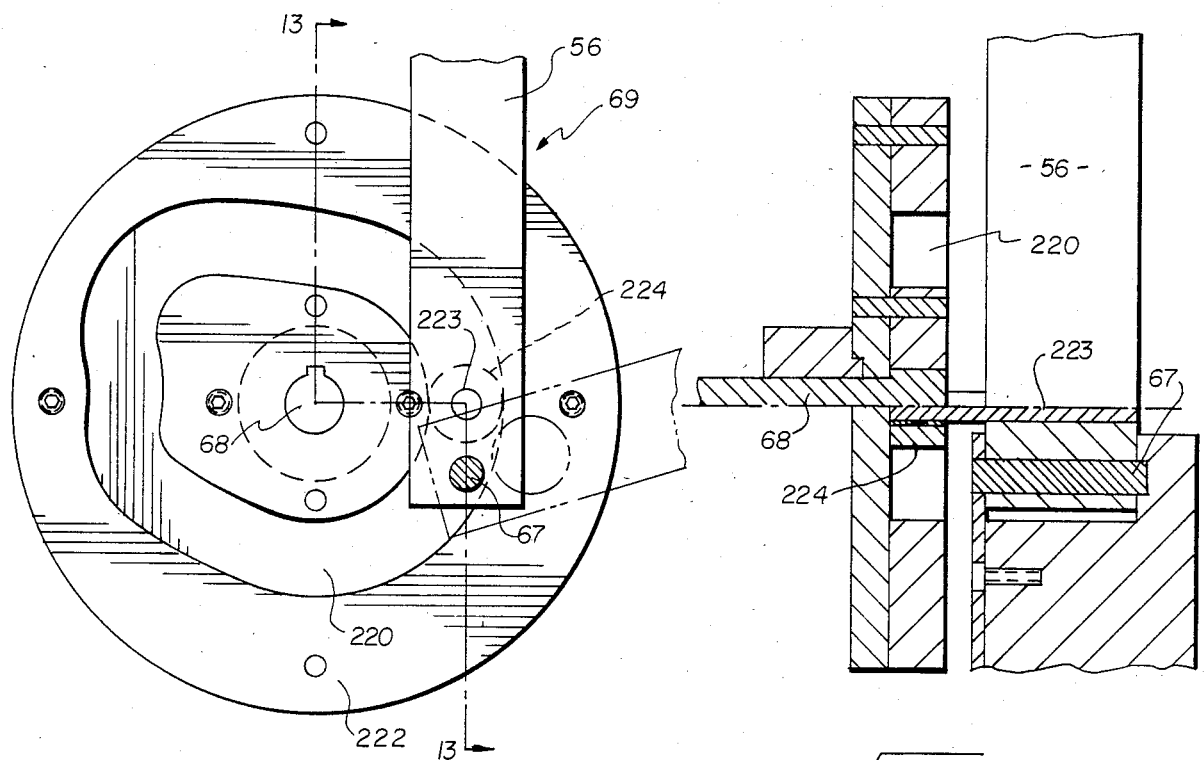
FIG 12
FIG 13
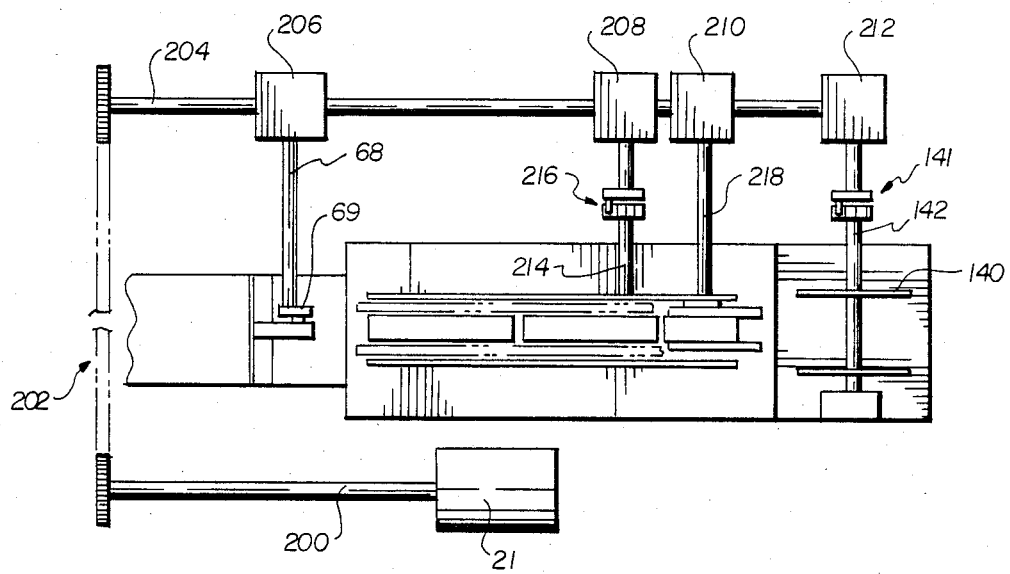
FIG 11

APPARATUS FOR ASSEMBLING BLOWER WHEEL BLADES

FIELD OF INVENTION

This invention relates to apparatus for assemblying and holding a plurality of individual blades in a predetermined relationship for the fabrication of blower wheels of the squirrel-cage type, used in centrifugal fans, commonly known as blowers.

BACKGROUND OF THE INVENTION

Centrifugal blower wheels may be constructed from a strip of sheet metal by punching out the blades from the strip in the form of louvers which leave the edges of the strip intact. In the alternative, individual blades may be stamped and cut from the strip and a blower wheel may be assembled from a group of these individual blades by securing opposite ends of the blades together so that they are permanently fastened in proper operative relation. The present invention is concerned with assembling a plurality of individual blades into a predetermined circumferentially spaced relationship about a central axis corresponding to the spaced blade relationship in a finished blower wheel.

In the past, centrifugal blower wheels, such as those used to draw air through furnaces and air conditioners and the like, have frequently been assembled almost entirely by hand. The usual methods of manufacturing blower wheels require mounting individual blades on a fixture in a predetermined relationship corresponding to the blade positioning in the finished blower wheel and then attaching rims or end rings to flanges at opposite ends of each blade while the blades are held in the fixture. The fixture is then removed and replaced by a center disc for mounting the blower on a drive shaft.

One means for attaching blades to a rim is by holding the rim adjacent to flanges at opposite ends of each blade and then spinning the composite structure in a machine which crimps a portion of the end ring around the blade flanges. Securing means such as welding, riveting or the like also may be employed. However, before the blades can be secured to end rings, rims or the like, they must be properly positioned. Although machines have been developed in the past to fasten plural blades to end members while the blades are held in a fixture, many prior art methods of manufacture require manual handling of the blades to place them in the fixture.

There have been only a few suggestions of apparatus for automatically handling individual blades so as to properly position the blades for application of an end ring or the like. For example, see U.S. Pat. Nos. 2,996,788 and 3,186,068 to Austin, et al., U.S. Pat. Nos. 2,651,830 and 2,651,837 to Wilken, et al., and U.S. Pat. Nos. 3,253,318 and 3,305,912 to Wentling, et al., the entire contents of said patents being incorporated herein by reference. Such prior art machines involve complicated operations and complex components with large numbers of machined parts which are expensive to manufacture and/or maintain. In addition, the relatively large number of moving and cooperating parts in combination with loosely held blades can cause misalignment and/or binding of blades which result in frequent shutdowns to clear up jammed blades and/or components. Furthermore, loose blades can cause misfeeds which leave a vacant position in the fixture which first must be noticed by an operator and then filled by hand before the blades are permanently attached to a rim if a defective blower wheel is to be avoided.

The foregoing disadvantages and problems with prior art devices are alleviated by the present invention.

DISCLOSURE OF THE INVENTION

The invention provides an apparatus for automatically making and assembling blower wheel blades in a fixture means. Individual blades are first formed in a forming means and then conveyed to and inserted in a fixture means in a predetermined relationship corresponding to the relative blade positioning in a finished blower wheel. A first transfer means positively engages each blade while still in the forming means and firmly holds the individual blade in a fixed position while transferring it from the forming means to a loading station of a conveying means. A second transfer means at an unloading station of the conveying positively engages each blade so as to firmly hold it in a fixed position while transferring the blade from the unloading station to the fixture means.

The invention is also capable of assembling individual blades for blower wheels having different diameters, number of blades and blade lengths, and is easily adjustable from one fixture size to another requiring a relative small amount of time and effort by a single operator.

Although other types of forming means, such as for molding or extruding, may be employed, individual elongated blades are preferably stamped and cut from a strip of sheet metal stock by a die press. A continuous sheet metal strip is fed into the die press from a roll of stock by a feeder that advances the stock through the press in short increments corresponding to the width of a single blade. The stock is successively passed through different sets of metal working dies so as to form an elongated blade of arcuate transverse cross-section with a flange at opposite ends to provide a means for securing the blade to an end ring or rim. The final set of upper and lower dies cuts a completely formed blade from the strip of stock so that individual blades can be removed from the press.

A first transfer means at a conveyor loading station separately transfers each individual blade from the die press to a conveyor means for conveying the individual blades to a fixture means for securely holding the blades in a desired predetermined relationship. The first transfer means includes a head for positively engaging each blade on a surface of the die so as to pick up and firmly hold the blade in a fixed position during its transfer from the die press to the conveyor means. The invention includes means for releasing the blade from the first transfer means so as to deposit the blade in a cradle means. The cradle means receives and firmly holds individual blades in a predetermined, transversely spaced relation on the conveyor means and conveys the blades to a second transfer means at an unloading station where individual blades are transferred from the conveyor means to the fixture means. The head of the first transfer means includes suction means for holding an individual blade in a fixed position against an underside of the head. The head is carried by a rocker arm which is pivotally mounted and reciprocated by drive means between a first position for engaging a blade while it is still supported on at least a portion of a lower die and a second position at which the blade has been released from the transfer head and deposited in the cradle means.

The second transfer means includes a pair of second transfer heads for positively engaging each blade held by the cradle means so as to pick up and firmly hold the blade in a fixed position during its transfer from the conveyor means to the fixture means where it is inserted in a blade clamping means carried by the fixture means. Drive means for causing movement of the various components includes an indexing means for positioning the cradle means so as to receive individual blades from the first transfer means and for positioning the fixture means so that its clamping means receives individual blades from the second transfer means. The second transfer means further includes magnetic means on each transfer head for positively holding an individual blade firmly in a fixed position on the second transfer means. A pair of sliding arms reciprocated by the drive means move the pair of blade engaging heads between a first position for engaging an individual blade while it is supported on the conveyor by the cradle means and a second position for inserting the blade in the clamping means carried by the fixture.

While use of a suction means on the first transfer head and a magnetic means on the second transfer heads is preferred, it is to be understood that the engaging means of the first head may be magnetic and the engaging means of the second heads may be suction or in the alternative that both engaging means may be either magnetic or suction or a combination thereof.

The invention also includes a fixture means for receiving and securely holding a plurality of individual blades in a predetermined spaced relationship corresponding to the blade spacing in an assembled blower wheel. The preferred blade holding fixture includes a pair of holding discs arranged in a spaced coaxial relationship on a rotatable shaft extending along a central axis of the fixture. Each holding disc has a plurality of individually mounted radial projections forming circumferentially spaced slots around the periphery of the holding disc, each slot being adapted to receive the inner edge of an individual blade. A resilient means carried by each projection preferably includes a resiliently biased member extending into each holding slot so as to engage the surface of a blade inserted in the slot. A pair of pressure discs are also arranged in spaced coaxial relationship on the central shaft of the fixture so that a pressure disc is positioned adjacent to each holding disc. The pressure discs each have a plurality of radially projecting fingers and a first position relative to the adjacent holding disc in which the fingers overlap at least a portion of the holding slots. This overlapping position is such that a pair of axially aligned fingers will engage a blade inserted in a pair of axially aligned holding slots so as to force the blade against two resiliently biased members which thereby exert a holding pressure against the blade and cause sufficient frictional engagement between the pressure fingers and the blade to securely hold the blade in a fixed position within the holding slot. Each pressure disc has a second relative position in which the overlap between the pressure fingers and the holding slots is entirely eliminated or is reduced by an amount sufficient to release the holding pressure and permit removal of the blades from the fixture.

Means is provided for rotating the pressure discs and the holding discs relative to each other between their first and second positions and for locking the two pairs of cooperating discs in their overlapped or clamping position for firmly gripping the inner edge portions of blades inserted within the holding slots. With each blade firmly clamped in two aligned slots, the fixture can be removed from the blade assembly mechanism of the invention and transferred to a spinning apparatus for crimping annular rims around the flanges at opposite ends of each blade so as to secure the plurality of blades together in proper position for completing assembly of a blower wheel. After the rims are secured to the individual blades by this spinning operation, the holding and pressure discs are released for movement relative to each other so as to release the holding pressure on each blade and permit the fixture to be removed from the interior of the resulting squirrel-cage assembly of blades. In other words, with the two sets of adjacent discs in their released or second positions, the overlap between the fingers and the slots is eliminated altogether or sufficiently reduced so that the blades are free to slide through the slots of the holding discs as the fixture is pulled axially out of the interior of the concentrically assembled blades. The fixture is subsequently replaced by a center disc which is permanently clamped to an inner edge portion of each blade and has a hub for attachment to the drive shaft of a motor for rotating the blower wheel as a centrifugal squirrel-cage type fan.

The invention also includes means, which is preferably mounted adjacent to the conveyor, for causing axial offset of every other blade on the conveyor relative to the remaining blades so that the blades can be inserted in the fixture with flanges at opposite ends of adjacent blades in a staggered relationship. This staggered relationship prevents interference between adjacent flanges during insertion of the blades in the closely spaced holding slots of the fixture. Without this staggered arrangement, interference between adjacent flanges can cause misalignment of a blade with a slot so as to jam the transfer mechanism for unloading the conveyor and/or damage one or more blades.

The fixture is mounted for rotation on a frame which is adjustable relative to a supporting bed so as to permit movement of the central axis of the fixture relative to the unloading station of the conveyor. This adjustment allows accommodation of fixtures having different diameters for holding different numbers of blades at different radii from the central axis corresponding to blower wheels of different diameters. The invention further includes drive means for driving the sheet metal feeder, the die press, the first transfer means, the conveyor, the second transfer means, and the fixture through indexing and timing cams and/or gears so that each operation is synchronized with the next successive operation. The drive means includes an automatic control means which is adjustable and is set to cut off the drive means after the die press has made a preselected number of strokes corresponding to the number of blades required to fill a fixture of known diameter and with a known number of slots for receiving blades.

The stamping press preferably is capable of using die sets of different sizes which are readily interchangeable so as to produce blades of both different lengths and widths, depending on the performance characteristics of the blower wheel desired. Each die set includes upper and lower dies and these dies are mounted upon upper and lower bolsters, respectively, of the die press, preferably by quick change clamping mechanisms of the type described in U.S. Pat. Nos. 3,834,217 and 3,881,343 to Ducate, the entire contents of said patents being incorporated herein by reference. Blades of different lengths and different widths are easily accommodated by the first and second transfer means, the conveyor and the fixture of the invention. So that it can be aligned with the ends of blades of different lengths, the pusher mechanism for staggering the blades is adjustable on its bed in a direction transverse to the direction of travel of blades on the conveyor.

After the fixture has been fully loaded with a blade in each holding slot, it is removed from the blade assembling apparatus and placed in a conventional spinning machine (not shown) for the application of rims or other end members to opposite ends of the plurality of substantially identical blades which are firmly held by the fixture in a uniformly spaced relationship corresponding to the blade spacing in a finished blower wheel. The fully loaded blade fixture may be moved into operative position within a spinning machine either by hand or by an automatic conveying mechanism. In the spinning machine, the end rims are first pushed toward each other along the rotational axis of the fixture by opposing plates of a press component so as to bring the flanges at opposite ends of the blades into alignment in the plane of the rim. The pressure applied is sufficient to move the staggered blades axially through the holding slots of the fixture while holding pressure is still being applied to each blade by the clamping means. The entire assembly, including blades, end rims and the fixture, is then spun so that the end rims pass through a crimping means which bends an annular lip of the rim over the flanges of the individual blades so as to permanently secure the blades to the rims which then serve as end members of the blower wheel. As an alternative, after the flanges of the individual blades are brought into alignment, the blades may be secured to rims or other types of end members by means other than crimping, such as by welding, riveting or the like. Thereafter, the fixture is removed and a drive disc with a shaft mounting hub is secured by deformation or some other means to the inner edges of each blade. One illustrative method of attaching end rings and drive discs to the assembled blades is given in U.S. Pat. No. 3,737,966 to Ranz, the entire contents of said patent being incorporated herein by reference. As finally assembled, the centrifugal blower wheel has a pair of annular and coaxial end members with a coaxially spaced drive disc therebetween. Each of these members are rigidly secured to a plurality of substantially identical, axially and radially extending blades that are uniformly and circumferentially spaced about a central axis of rotation.

It is therefore a primary object of the invention to integrate the forming of individual blades with the assembly of the blades into a predetermined spaced relationship corresponding to the blade spacing in a finished centrifugal blower wheel. The means for forming the blades preferably comprises a metal shaping press, the operation of which is integrated with the operation of the blade assembling apparatus. The preferred press automatically shapes and cuts individual blower blades from sheet metal. The elongated and transversely curved blade portion and the blade flanges are progressively formed in a timed sequence that is integrated with operation of the blade assembling apparatus. As individual blades are successively formed, they are separately transported to the fixture with each blade securely held in the position required for the next operation. The invention thus automatically and efficiently transfers individual blades from the press to the holding fixture so that the rate of blower wheel production is significantly increased above that generally prevailing in the art. The forming, conveying, transferring and securing of individual blades in the fixture are completely automatic and these operations automatically terminate when the fixture is completely filled with blades so that operation of the composite system requires a minimum of attention from the operator.

BRIEF DESCRIPTION OF THE DRAWINGS

The invention, both as to its structure and method of operation, may be further understood by reference to the more detailed description below taken in conjunction with the accompanying drawings in which:

FIG. 3 is a fragmentary perspective view of a finished blower wheel blade.

FIG. 4 is an elevational view illustrating the unloading end of a die press diagrammatically and the blade conveyor in partial section;

FIG. 5 is a plan view of the components illustrated in FIG. 4;

FIG. 6 is an elevational view illustrating the transfer mechanism for transferring individual blades from the unloading end of the conveyor to a blade holding fixture;

FIG. 7 is an end view of the blade holding fixture of FIG. 6;

FIG. 8 is a fragmentary view illustrating in partial section details of the clamping mechanism for holding individual blades in peripheral slots of the blade holding fixture of FIG. 6.

FIG. 9 is a sectional view illustrating details of the locking pin for operating the clamping mechanism of FIG. 8; and, FIG. 10 is a fragmentary perspective view illustrating details of the suction head portion of the transfer mechanism of FIG. 2.

FIG. 11 is a diagrammatic view in plan of the drive assembly and indexing mechanisms for driving each of the components of the blade assemblying apparatus in timed sequence for passing individual blades from one component to the next.

FIG. 12 is an elevational view showing details of the indexing cam for reciprocating the arm transferring individual blades from the unloading end of a die press to the loading end of the conveyor.

FIG. 13 is a cross-sectional view of the cam mechanism of FIG. 12 taken along lines 13—13.

BEST MODE AND OTHER EMBODIMENTS FOR CARRYING OUT THE INVENTION

Figure 1:
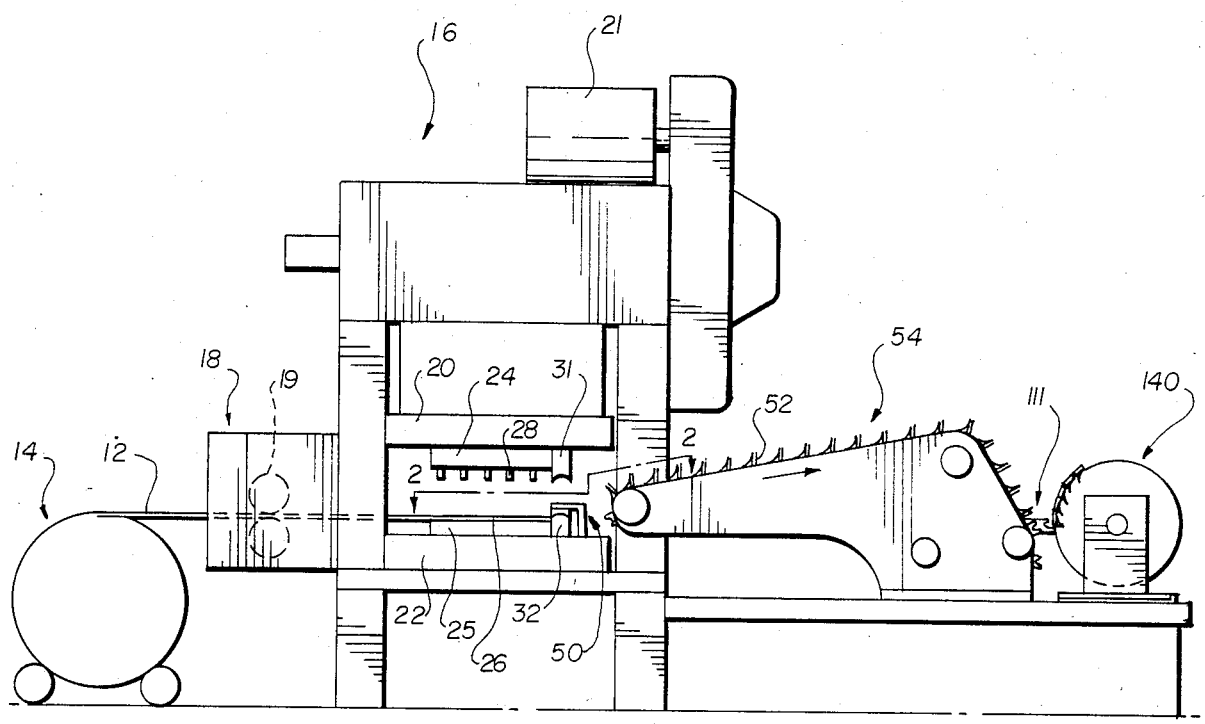
FIG. 1 is a diagrammatic view in elevation of the blade assembling apparatus of the invention installed so as to remove blower wheel blades from a die press.

A preferred embodiment of the present invention is shown diagrammatically in FIG. 1 of the drawings where a strip 12 from a supply roll 14 of sheet metal stock is fed between the dies of a stamping press 16 by a conventional feeder 18 having pressure rolls 19 for engaging and incrementally advancing strip 12 through the press. Double roll feeders of this type are available from Vanco Corporation of Pittsburgh, Pa. As an alternative, the feeder may be of a cam indexing type or any other commercially available feeder capable of advancing strip 12 in increments of high dimensional accuracy. These types of feeders include ratchet drives or other means for eliminating slippage and assuring precision feed increments in thousandths of an inch.

Press 16 includes an upper bolster 20 which is driven by a motor 21 so as to reciprocate up and down relative to an underlying lower bolster 22. An upper working die 24 is carried by bolster 20 and reciprocates relative to and cooperates with a lower working die 25 mounted on bolster 22. As bolster 20 reciprocates, the upper and lower dies cooperate so as to stamp blade blanks from a worked section 26 of stock 12, worked section 26 being accurately positioned relative to the dies by means of pins 28 carried by upper die 24. Pins 28 cooperate with holes 29 in metal strip 12 and corresponding holes in lower die 25. The final blade shaping operation is carried out by a cutting die with a concave upper member 31 cooperating with a convex lower member 32 so as to provide an arcuate blade shape and cut a single finished blade from worked section 26 of strip 12.

Figure 2:
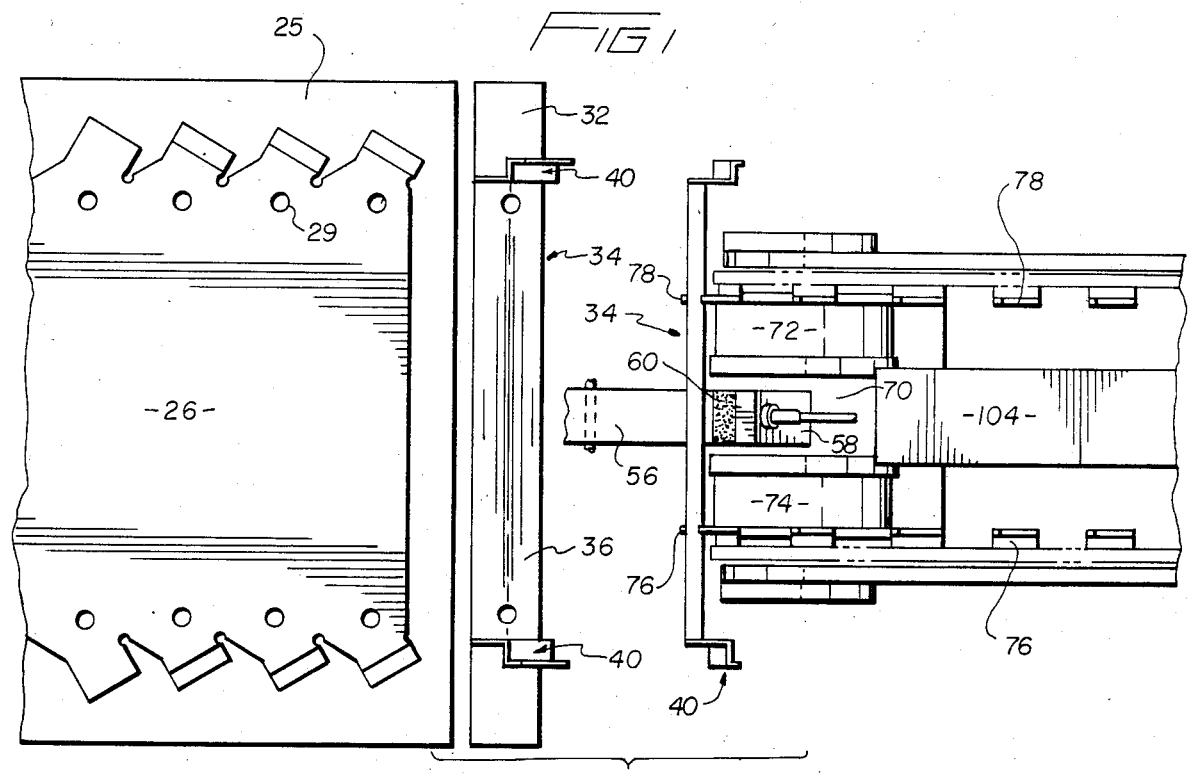
FIG. 2 is a fragmentary plan view taken along lines 2—2 of FIG. 1 and illustrating the transfer mechanism for transferring individual blades from the lower die of a die press to the blade conveyor.

As shown best in FIGS. 2 and 3, each individual blade 34 has a concave forward working face 35 and a convex rear face 36 both of which are arcuately shaped in transverse cross-section and in a substantially uniform manner over the major portion of the length of the elongated blade. An inner edge 37 of each blade is adapted to lie innermost in the finished blower wheel and an outer edge 38 is adapted to lie outermost in the finished blower wheel. At opposite ends of the blade, its thin flat body is bent outward at approximately a right angle to the blade faces so as to form a laterally extending wall 39 which terminates in an L-shaped flange 40 having an axial leg 41 and a radial leg 42. The outermost edge 43 of flange 40 may be either arcuate as shown about a radius corresponding to the radius of the finished blower wheel or it may be relatively straight. When the final blower wheel is assembled, it has multiple blades extending around its circumference and those blades are held permanently in spaced relation to each other by rims (not shown) affixed to opposite ends of the blades. Affixture is accomplished by crimping radial leg 42 of flange 40 within an annular lip or flange of the rim so as to rigidly secure each of the blades in position and form a squirrel-cage like wheel structure.

With reference to FIGS. 2 and 4, a blade transfer arm 56 at a conveyor loading station 50 picks up an individual blade 34 off of the lower cutting die 32 and transfers the blade to one of a series of cradles 52 carried by an endless conveyor, generally designated 54. Arm 56 is pivotally mounted so as to reciprocate a blade engaging head 58. As seen best in FIG. 10, head 58 has a suction portion comprised of a resilient pad 60 preferably of an elastomeric foam. Pad 60 has an aperture 61 which communicates with a suction line 62 through a chamber 63 and a passageway 64 within head 58. Blade 34 is engaged by suction pad 60 while it rests on lower cutting die 32 which is biased upward by a spring 66 such that die 32 is resiliently mounted relative to lower bolster 22 and adjacent working die 25. This resilient mounting of die 32, as well as the resiliency of foam pad 60, permits actual contact between blade transfer assembly 50 and the die supported blade without damaging any of the contacting components, namely, die 32 and head 58, and blade 34 engaged therebetween.

Arm 56 reciprocates back and forth through a limited amount of arc in the directions of arrow R and is pivoted about a pin 67 by a shaft 68 which drives arm 56 through a cam mechanism 69 as described in more detail below. This causes head 58 to reciprocate between a pick-up position in contact with a blade 34 on die 32 and a release position in an alley 70 between two coaxially spaced magnetic pulleys 72 and 74 at the loading end of conveyor 54. As head 58 passes into alley 70, the convex face 36 of blade 34 is engaged by opposing ribs 76 and 78 of cradle 52 so as to physically release the blade from suction pad 60 as head 58 continues to travel into alley 70 for a substantial distance beyond that at which the blade is engaged by the cradle. The blade holding cradle then moves upward around pulleys 72 and 74 so as to clear the entrance to alley 70 and permit head 58 to reciprocate back toward its pick-up position at the die. Blade 34 is held in cradle 52 by the magnetic attraction of pulleys 72 and 74 as the cradle moves around these pulleys and carries blade 34 from substantially a vertical position to substantially a horizontal position on the conveyor.

Cradles 52 are moved along the various runs of conveyor 54 by means of two endless chains 80 and 81 as shown in FIG. 5. Chains 80 and 81 pass around turning sprockets 82, 84, 86 and 88 and tensioning sprocket 90 as shown in FIG. 4. The tension provided by sprocket 90 is adjusted by turning nut 93 on threaded shaft 92 so as to adjust the position of carriage 94 upon which tensioning sprocket 90 is rotatably mounted. Pairs of running sprockets 96, 98, and 100 help support the weight of the conveyor chains when each cradle 52 is loaded with a blade along the horizontal upper run of the conveyor. A pair of running sprockets 102 helps support the weight of loaded cradles along a downwardly slanted run at the unloading end of the conveyor opposite to a blade holding fixture 140. A series of elongated magnetic bars 104, 105, 106 and 107 extend longitudinally along the upper and unloading runs of the conveyor and are spaced closely adjacent to the rear face 36 of blades on the conveyor so that magnetic attraction holds each blade firmly in position within its cradle as the individual blades traverse the upper and unloading runs of the conveyor. A pair of magnetic pulleys 109 and 110 are associated with turning sprocket 84 so as to keep the blades in position as the cradles round sprocket 84 in moving from the upper run to the unloading run of the conveyor.

A pair of blade transfer arms 112 and 114 are located at a conveyor unloading station 111 and are arranged to pass between opposite sides of magnetic bar 107 and adjacent cradle ribs 76 and 78 as carried by chains 80 and 81 just prior to passage of these chains around turning sprockets 86 at the lower end of the unloading run of the conveyor. Arms 112 and 114 comprise the legs of a U-shaped member 116 carried by a shuttle 118 which is supported for sliding movement within U-shaped brackets 120 and 121. Shuttle 118 and connected arms 112 and 114 are caused to reciprocate in a substantially horizontal plane by means of a cam plate 124 carried by shuttle 118. Cam plate 124 has a vertical slot 125 which is engaged by a cam pin 126 eccentrically mounted on a rotating cam wheel 128. Rotation of cam wheel 128 causes pin 126 to move up and down in slot 125 so as to oscillate shuttle 118 and thereby reciprocate arms 112 and 114 back and forth past cradles 52 as the cradles move down the unloading run of the conveyor. Mounted on the end of unloading arms 112 and 114 are blade engaging heads 130 and 132, respectively, each head containing a magnet 134 for causing positive engagement between the head and a section of the blade so as to firmly hold each blade in a fixed position relative to the unloading arms 112 and 114.

As seen best in FIG. 6, arms 112 and 114 function as a second transfer assembly for transferring blades from the unloading end of the conveyor to a blade holding fixture 140. Fixture 140 includes means described in more detail below for gripping the inner edge portion of each blade so as to firmly secure and hold a plurality of blades in a predetermined spaced relationship corresponding to the blade spacing in a finished blower wheel. Fixture 140 includes a drive shaft 142, the ends of which are rotatably supported in opposing pillows 144, only one of which is shown in FIG. 6. One end of shaft 142 has a portion cut-away to form a key way 143 which is engaged by a Geneva mechanism 141 so as to rotate fixture 140 in increments corresponding to the desired blade spacing.

Each pillow 144 is mounted on a pedestal 145 slidably carried on a track 146 in a supporting base 148. The position of pedestal 145 on track 146 may be adjusted by means of a pin 150 which engages one of a series of holes 152 so as to lock pedestal 145 in a preselected position relative to base 148. The adjustment of pedestal 145 relative to base 148 permits adjustment of pillows 144 either toward or away from the unloading end of the conveyor so as to accommodate fixtures of different diameters corresponding to blower wheels of different diameters and associated capacities.

As seen best in FIG. 7, fixture 140 has a pair of coaxially spaced members 150 and 152 each comprised of an outer holding disc 154 coaxially mounted on shaft 142 adjacent to an inner pressure disc 155. Referring to FIGS. 6 and 8, holding disc 154 is comprised of a circular base plate 158 keyed for rotation with shaft 142 by a key 159 and having around its periphery a series of identical projections 160 each carrying a blade engaging plunger 162. Each projection 160 is an inverted L-shaped piece extending around the outside edge of the base plate periphery and secured to this plate by an allen screw 161. Each projection cooperates with an identical projection on either side to form a series of blade holding slots 164 extending along the periphery of base plate 158. Plunger 162 is resiliently biased into at least a portion of slot 164 by a coil spring 166, the base of plunger 162 being retained in a counterbore on the opposite side of the projection from the plunger head by a locking ring 168 which engages a groove (not shown) around the base of the plunger shaft.

Since the operation of members 150 and 152 are identical, except for being mirror images of each other, only member 150 will be described. Although pressure disc 155 is shown as abutting holding disc 154, these two discs may be spaced a substantial distance apart and still perform their prescribed function. Similarly, while holding disc 154 is shown keyed to the drive shaft 142, pressure disc 155 may be keyed to the drive shaft instead and holding disc 154 moved relative to pressure disc 155 instead of vice versa. In the embodiment shown, pressure disc 155 is mounted for limited rotation on shaft 142 relative to holding disc 154 by a journal ridge 170 around shaft 142. Relative rotation between the two discs is limited by a locking pin 172, the details of which are shown in FIG. 9 and described below. Thus, pressure disc 155 is free to rotate relative to shaft 142 and holding disc 154 except for the provision of locking pin 172.

Referring to FIG. 9, pin 172 has a release head 174 outside of holding plate 154 and a locking head 176 on the inside of pressure plate 155. The heads 174 and 176 are joined by a neck having a small diameter section 178 and a large diameter section 180, the neck passing through an aperture 181 of uniform diameter in both discs 154 and 155. Aperture 181 has a diameter slightly larger than large neck section 180. The small neck section 178 passes through a slightly larger aperture 179 in a circular plate 182 secured to the outside of holding plate 154 by allen head machine screws 184.

Pressure disc 155 has a series of identical radially projecting fingers 186 extending around its periphery. When pin 172 is in the solid line position shown in FIG. 9, pressure disc 155 is secured to holding disc 154 so as to prevent relative movement between the two discs. This is the clamping position of the discs as shown best in FIG. 6 and in this position, fingers 186 of the pressure disc overlap the blade receiving slots 164 of the holding disc so as to force a blade in the slot firmly against the head of resiliently biased plunger 162 and thereby firmly hold the inner edge portion of the blade in slot 164. The overlapping portion of fingers 186 are shown in solid lines in FIG. 6 and in dotted outline in FIG. 8. The solid line position of fingers 186 in FIG. 8 is the blade releasing or non-clamping position of fingers 186 relative to holding disc projections 160. The relative positions of discs 154 and 155 in their released condition are achieved by moving pin 172 to its dotted line position in FIG. 9. Because of binding engagement between the two discs and the pin caused by the pressure between plungers 162 and the multiple blades held in slots 164, a strong force is needed to move pin 172 to its release position when the fixture is full of blades. The release force needed can be obtained by hitting release head 174 with a mallet or the like. When pin 172 is in its dotted line position, the narrow neck portion 178 is positioned within the much larger aperture 181 of disc 155 allowing disc 155 to rotate relative to holding disc 154 under the influence of the spring pressure applied against the blades, and through the blades to fingers 186, by biasing springs 166.

Each finger 186 preferably has an arcuate leading edge 188 for engaging a portion of the concave face 35 of each blade 34, thereby maximizing the frictional engagement between fingers 186 and the concave face of each blade. The releasing position of pin 172 is further illustrated in FIG. 7 where a portion of the narrow neck is visible because pin 172 has been pushed inward. Pin 172 is easily pushed outward to its locking or clamping position because it is placed in this position when the fixture is empty of blades. After insertion of a blade in one or more slots 164, there will be binding friction between discs 154 and 155 and the large neck portion 180 of pin 172 due to the biasing pressure of plungers 162 as previously explained.

As illustrated in FIG. 6, blade engaging heads 130 and 132 on the outer ends of pusher arms 112 and 114, respectively, force the inner portion of each blade into an aligned slot 164 and between an associated plunger 162 and the leading edge 188 of an associated finger 186. This fixture loading action occurs at the outermost travel limit of arms 112 and 114 and then the arms reciprocate back into the conveyor for picking up the next blade while an indexing drive rotates the fixture to present the next vacant slot to the next feeding action of the blade holding heads 130 and 132.

Adjacent to the unloading run of the conveyor is a transversely mounted pusher mechanism 190 having a reciprocating piston 192 arranged to engage one of the flanged ends of blades 34. Pusher 190 is mounted on an L-shaped bracket 194 having a track 196 for lateral adjustment of pusher 190 relative to the direction of travel of conveyor 54 so as to accommodate blades of different lengths. Pusher 190 is secured in operable position along track 196 by a clamping bolt 198.

The outer end of piston 192 is positioned adjacent to one end of blades passing by on cradles 52 and reciprocation of piston 192 is timed so as to axially engage and offset every other blade on the conveyor relative to the remaining blades. The offset blades are then inserted in the fixture with flanges at opposite ends of adjacent blades in a staggered relationship as illustrated best by the blades shown in phantom outline in FIG. 7. Piston 192 can be reciprocated by a cam arrangement similar to that of shuttle 118 described above, or by a conventional Geneva mechanism. Alternately, pusher 190 may comprise an air cylinder containing an air piston resiliently biased inward to its retracted position and reciprocated outward by air pressure. The staggered relationship between adjacent blades prevents interference between adjacent flanges during insertion of the blades in the closely spaced holding slots 164 of fixture 140. If the blades are not staggered in this fashion, interference between adjacent flanges can cause misalignment of blades relative to slots 164 and such misalignment can jam the conveyor unloading assembly and/or damage one or more blades.

With reference to FIG. 11, each of the components of the blade assembly apparatus of the invention is driven by motor 21 of the die press through a drive and indexing assembly for synchronizing movement of each of the components so that it is in the proper position to receive an individual blade from the preceding component. Press motor 21 provides motive power to the respective components through a motor output shaft 200, a chain and sprocket drive 202, a common or multiple take-off drive shaft 204, and a series of gear boxes 206, 208, 210 and 212. Gear box 206 drives reciprocating arm 56 through a cam mechanism 69 described below in more detail with reference to FIGS. 12 and 13. Gear box 208 drives conveyor drive sprocket 90 through a connecting shaft 214 which is connected to the gear box through a conventional Geneva mechanism 216 which operates similar to a clock mechanism for providing incremental or stepped movement of conveyor 54. Gear box 210 is connected by a shaft 218 to cam wheel 128 for reciprocating shuttle 118 which carries the conveyor unloading arms 112 and 114 as previously described. Gear box 212 drives the blade holding fixture 140 through a conventional Geneva mechanism 141 and drive shaft 142 so as to provide incremental or stepped movement of the fixture relative to reciprocating arms 112 and 114.

The reciprocating arm 56 for loading the conveyor is driven through a cam mechanism 69 having a specially shaped cam track 220 cut in a cam disc 222 keyed to drive shaft 68. Arm 56 carries a cam follower roller 224 rotatably mounted on a journal pin 223. Follower 224 fits within and follows track 220 as disc 222 rotates. Although cam follower 224 can be located on either side of pivot pin 67, it is preferably located between pin 67 and head 58 as shown in FIGS. 12 and 13. As disc 222 rotates with follower 224 in track 220, arm 56 is caused to reciprocate back and forth in timed sequence relative to the reciprocating action of upper die press bolster 20 and the stepwise movement of cradles 52 on conveyor 54.

The indexing and synchronization provided by the foregoing drive and indexing assembly operates as follows. While the reciprocating arm 56 is picking up a blade off of die press member 32, a cradle 52 is moved into position and stops so as to receive blade 34 as arm 56 reciprocates into conveyor alley 70. Cradle 54 then moves upward around pulley 82 in stepwise fashion thereby opening the mouth of alley 70 so that arm 56 can reciprocate again toward the die press. In a similar manner, a blade carrying cradle 52 at the opposite end of the conveyor stops momentarily adjacent to the retracted heads 130 and 132 of the conveyor unloading arms 112 and 114. The unloading arms then reciprocate outward so as to free the blade from the cradle magnet and push it into a pair of aligned fixture slots which have stopped in position to receive the blade in accordance with the sequencing of Geneva mechanism 141. After depositing the blade in the aligned slots, shuttle 118 returns the unloading arms to their retracted position so that the cradle holding the next blade can enter the transfer area between the conveyor and the fixture. While the unloading arms are being retracted, Geneva mechanism 141 rotates fixture 140 by the incremental amount necessary to position the next pair of empty slots, which then receive a blade upon the next outward reciprocation of unloading arms 112 and 114. It is thus apparent that individual blower wheel blades are formed separately by the die press, and then are transferred separately in stepwise fashion from the last station of the press to a conveyor cradle, are advanced separately in stepwise fashion from the loading station to the unloading station of the conveyor and are transferred separately in stepwise fashion from the conveyor unloading station to the fixture.

A mechanical or electronic counter counts the number of reciprocations of the die press and an electrical circuit (not shown) for activating press motor 21 includes a switch that automatically deactivates electrical power to the motor when a preset number of bolster strokes have been logged by the counter so as to cut off motive power to all components as soon as the last pair of vacant slots in fixture 140 have been filled with a blade. After the fully loaded fixture has been removed and replaced by an empty fixture, the power switch is then reset so as to again provide electrical power to motor 21. The preset number of reciprocations selected for the power switch deactivating mechanism can be varied so as to accommodate fixtures with different numbers of slots, depending on the number of blades required for different sizes of blower wheels.

INDUSTRIAL APPLICABILITY

The invention provides an apparatus whereby individual blower wheel blades are automatically formed from a supply of stock material and automatically assembled after forming into a predetermined spaced relationship corresponding to the blade spacing in a finished blower wheel. A blade fixture receives, accurately aligns and securely holds the blades in this assembled relationship. The fixture then facilitates the placement and securing of permanent end members to opposite ends of the aligned blades. The invention eliminates manual handling of individual blades and thereby reduces the cost of manufacturing blower wheels. In addition, multiple blower wheels may be fabricated more accurately and uniformly with greater ease, with less time required and with less danger to the operator than with prior art machines for assembling blower blades. The invention is capable of assembling blades for blower wheels having different diameters, number of blades, and blade lengths and requires the attention of only a single operator and a relatively small amount of time to change from one size of blade assembly to another.

Because the individual blades are assembled and mechanically attached to the end members and driving disc without the use of any heating operation, a wide variety of materials may be used for making the blades and a base blade material may be galvanized or otherwise surface treated. Thus, while malleable blade materials are preferred for die forming of the blades, the invention contemplates other blade materials, such as non-metallic, and other types of forming machinery, such as casting, molding or the like.

The blade assembly apparatus described thus provides an improved blower wheel which is simple and economical in construction, which has individual blades shaped to maximize performance and air delivery, which is of high strength, stiffness and balance, which is capable of operating with minimum vibration and noise at high rotational speeds, and which can be assembled at less expense than heretofore possible.

What at is claimed is:

1. A blade assembling apparatus for engaging individual elongated blades provided by a blade forming means and assembling a plurality of said blades in a predetermined spaced relationship for securing the blades together to form a centrifugal blower wheel, said apparatus comprising:

blade fixture means for receiving and holding said blades in a predetermined spaced relationship corresponding to the blade spacing in said blower wheel;

conveyor means for conveying said blades from said forming means to said fixture means;

transfer means for transferring individual blades from said forming means to said conveyor means and from said conveyor means to said fixture means; and, drive means for positioning said conveyor means so as to receive each of said blades from said transfer means and for positioning said fixture means so as to receive each of said blades from said transfer means;

said blade fixture means including at least one holding disc in coaxial relation about a central axis of said fixture means, said holding disc having a plurality of radial projections forming circumferentially spaced slots extending along the periphery of said holding disc so as to receive an inner edge of said blades when said blades are transferred from said conveyor means to said fixture means, resilient means carried by each of said projections and extending into at least a portion of each of said slots, at least one pressure disc adjacent to said holding disc in a coaxially spaced relation about said central axis and having a plurality of radially projecting pressure fingers extending along the periphery of said pressure disc and positioned for overlapping said holding slots, said holding disc and said pressure disc being rotatable relative to each other about said central axis between a first position in which said pressure fingers overlap at least a portion of said holding slots so as to press blades inserted in said holding slots against said resilient means and cause said resilient means to exert a holding pressure on said blades, and a second position in which said overlap provided by said pressure fingers is reduced by an amount sufficient to release said holding pressure and permit removal of said blades from said holding slots.

2. A fixture apparatus for receiving and firmly holding a plurality of elongated blades in a predetermined spaced relationship corresponding to the blade spacing in a centrifugal blower wheel, said apparatus comprising:

a pair of holding discs in coaxially spaced relation about a central axis of said fixture apparatus, each holding disc having a plurality of radial projections forming circumferentially spaced slots extending along the periphery of said holding disc so as to receive an inner edge of said blades inserted transversely into said slots;

resilient means carried by each of said projections and extending into at least a portion of each of said slots; and, a pair of pressure discs in a coaxially spaced relation about said central axis, one of said pressure discs being positioned adjacent to one of said holding discs and the other of said pressure discs being positioned adjacent to the other of said holding discs, and each of said pressure discs having a plurality of radially projecting pressure fingers positioned for overlapping at least a portion of said slots;

each said holding discs and each said pressure discs in adjacent relation being rotatable relative to each other about said central axis between a first position in which said pressure fingers overlap at least a portion of said holding slots and press blades inserted in said holding slots against said resilient means so as to cause said resilient means to exert a holding pressure on said blades such that said blades are firmly held in said slots, and a second position in which said overlap is reduced by an amount sufficient to release said holding pressure and permit removal of said blades from said holding slots.

3. The apparatus of claim 2 in which said resilient means includes a spring biased member extending into said holding slot so as to engage at least a portion of a blade inserted therein when at least one other portion of said blade is engaged by a pressure finger of said pressure disc when said pressure disc and said holding disc are in said first position.

4. The apparatus of claim 2 in which the transverse cross-section of said blower wheel blades is arcuately shaped in a substantially uniform manner over a major portion of the length of said blades, and in which the leading edge of said pressure fingers overlapping said holding slots is arcuately curved along substantially the same radius as said transverse blade cross-section so as to provide for frictional engagement between said leading edge and said arcuately shaped blade portion when said blades are inserted transversely in said slots.

5. A blade assembling apparatus for engaging individual elongated blades provided by a forming means and assembling a plurality of said blades in a predetermined spaced relationship for securing the blades together to form a blower wheel, said apparatus comprising:

blade fixture means for receiving and holding said blades in a predetermined spaced relationship corresponding to the blade spacing in a blower wheel;

conveyor means for conveying said blades from said forming means to said fixture means, said conveyor means including cradle means for receiving and holding said blades in a predetermined spaced relationship for insertion in said fixture means;

first transfer means for transferring each of said blades from said forming means to said conveyor means, said first transfer means including retaining means for positively retaining each of said blades in a fixed position during transfer from said forming means to said conveyor means;

releasing means for releasing each of said blades from said retaining means upon transfer of the blades to said conveyor means;

second transfer means for transferring each of said blades from said conveyor means to said fixture means;

drive means for positioning said cradle means so as to receive each of said blades from said first transfer means and for positioning said fixture means so as to receive each of said blades from said second transfer means; and, means for causing axial movement of one blade relative to an adjacent blade so that said blades are loaded in said fixture means with flandes of adjacent blades in a staggered relationship so as to avoid interference between said flanges during transfer of said blades from said conveyor means to said fixture means.

6. The apparatus of claim 5 in which said staggering means engages one end of alternate blades carried by said conveyor means so as to move every other blade axially relative to the remaining blades before said blades are transferred from said conveyor means.

7. A blade assembling apparatus for engaging individual elongated blades provided by a forming means and assembling a plurality of said blades in a predetermined spaced relationship for securing the blades together to form a blower wheel, said apparatus comprising:

blade fixture means for receiving and holding said blades in a predetermined spaced relationship corresponding to the blade spacing in a blower wheel;

conveyor means for conveying said blades from said forming means to said fixture means, said conveyor means including cradle means for receiving and holding said blades in a predetermined spaced relationship for insertion in said fixture means;

first transfer means for transferring each of said blades from said forming means to said conveyor means, said first transfer means including retaining means for positively retaining each of said blades in a fixed position during transfer from said forming means to said conveyor means;

releasing means for releasing each of said blades from said retaining means upon transfer of the blades to said conveyor means;

second transfer means for transferring each of said blades from said conveyor means to said fixture means; and, drive means for positioning said cradle means so as to receive each of said blades from said first transfer means and for positioning said fixture means so as to receive each of said blades from said second transfer means; said blade fixture means including:

a pair of holding discs in coaxially spaced relation about a central axis of said fixture means, each holding disc having a plurality of radial projections forming circumferentially spaced slots extending along the periphery of said holding disc so as to receive an inner edge of said blades when said blades are transferred to said fixture means, resilient means carried by each of said projections and extending into at least a portion of each of said slots, and, a pair of pressure discs in a coaxially spaced relation about said central axis, one of said pressure discs being positioned adjacent to one of said holding discs and the other of said pressure discs being positioned adjacent to the other of said holding discs, each of said pressure discs having a plurality of radially projecting pressure fingers positioned for overlapping at least a portion of said holding slots, each said holding disc and each said pressure disc in adjacent relation being rotatable relative to each other about said central axis between a first position in which said pressure fingers overlap at least a portion of said holding slots so as to press blades inserted in said holding slots against said resilient means and cause said resilient means to exert a holding pressure on said blades, and a second position in which said overlap is reduced by an amount sufficient to release said holding pressure and permit removal of said blades from said holding slots.

8. A fixture apparatus for receiving and firmly holding a plurality of elongated blades in a predetermined spaced relationship corresponding to the blade spacing in a centrifugal blower wheel, said apparatus comprising:

at least one holding disc in coaxial relation about a central axis of said fixture apparatus, said holding disc having a plurality of radial projections forming circumferentially spaced slots extending along the periphery of said holding disc so as to receive an inner edge of said blades inserted transversely into said slots;

resilient means carried by each of said projections and extending into at least a portion of each of said slots; and, at least one pressure disc adjacent to said holding disc in a coaxially spaced relation about said central axis and having a plurality of radially projecting pressure fingers positioned for overlapping at least a portion of said slots;

said holding disc and said pressure disc being rotatable relative to each other about said central axis between a first position in which said pressure fingers overlap at least a portion of said holding slots so as to press blades inserted in said holding slots against said resilient means and cause said resilient means to exert a holding pressure on said blades, and a second position in which said overlap is reduced by an amount sufficient to release said holding pressure and permit removal of said blades from said holding slots.

* * * * *